United States Patent [19]
Gale et al.

[11] Patent Number: 5,444,566
[45] Date of Patent: Aug. 22, 1995

[54] OPTIMIZED ELECTRONIC OPERATION OF DIGITAL MICROMIRROR DEVICES

[75] Inventors: Richard O. Gale, Richardson; Randall S. Lawson, Plano; Harlan P. Cleveland, Garland; Henry Chu; Carl W. Davis, both of Plano; Scott D. Heimbuch; Claude E. Tew, both of Dallas, all of Tex.

[73] Assignee: Texas Instruments Incorporated, Dallas, Tex.

[21] Appl. No.: 206,812

[22] Filed: Mar. 7, 1994

[51] Int. Cl.$^6$ ............................................. G02B 26/08
[52] U.S. Cl. .................................. 359/291; 359/224; 359/230
[58] Field of Search ................. 359/224, 230, 291, 298

[56] References Cited

U.S. PATENT DOCUMENTS

| | | | |
|---|---|---|---|
| 5,061,049 | 10/1991 | Hornbeck | 359/224 |
| 5,096,279 | 3/1992 | Hornbeck et al. | 359/230 |
| 5,212,582 | 5/1993 | Nelson | 359/224 |
| 5,331,454 | 7/1994 | Hornbeck | 359/224 |

*Primary Examiner*—Mark Hellner
*Attorney, Agent, or Firm*—Charles A. Brill; James C. Kesterson; Richard L. Donaldson

[57] ABSTRACT

A method for controlling a digital micromirror device 40 resulting in decreased mechanical stress, longer device lifetimes, decreased incidence of spontaneous bit reset, and increased pulse-width modulation accuracy. To reduce the device stress, the bias voltage 142 applied to the mirror 50 may be reduced after the mirror 50 has been latched. To prevent premature mirror changes, the address electrode bias voltage 140 may be reduced after the mirror is driven to the desired position. To ensure that the mirror 50 returns to the neutral position during reset, the mirror bias voltage 142 may be raised from ground potential to approximately halfway between the two addressing voltages during the reset period 152. To reduce the effects of hinge memory and to ensure that the mirror 50 rotates toward the proper address electrode, the mirror bias voltage 142 may be gradually increased to allow the mirror 50 time to rotate towards the proper address electrode.

19 Claims, 8 Drawing Sheets

OPTIMIZED ELECTRONIC OPERATION OF DIGITAL MICROMIRROR DEVICES

FIELD OF THE INVENTION

This invention relates to the field of digital micromirror devices (DMDs) and more particularly to a method of controlling DMDs.

BACKGROUND OF THE INVENTION

Digital micromirror devices (DMDs) are taught in U.S. Pat. No. 5,061,049, "Spatial Light Modulator and Method," assigned to Texas Instruments Incorporated. DMDs are comprised of a very small deflectable structure, typically a mirror, suspended over an air gap. There are several forms of DMDs, each named after the means of supporting the mirror, including cantilever beam, cloverleaf, and torsion beam. The mirror of the torsion beam DMD is supported by two torsion hinges attached to opposing corners of the mirror. A voltage differential between the mirror and two address electrodes located under the mirror causes the mirror to deflect or rotate about the hinge axis until stopped by landing electrodes. When the mirror is deflected, light projected onto the surface of the mirror will be modulated by the deflected mirror.

When a change in mirror position is desired, a series of reset voltage pulses is applied to the mirror to free the minor from the landing electrode. The mirror is again deflected depending on the voltage bias applied to the addressing electrodes and the mirror. The electrostatic forces generated to deflect and reset the DMD mirrors stress the hinges and support structure of the DMD and can lead to the collapse of the support structure and premature wearout of the hinges. A need exists for a reset method that is capable of freeing stuck mirrors yet does not over stress the DMD hinges or induce any visual artifacts.

SUMMARY OF THE INVENTION

A spatial light modulator (SLM) biasing sequence has been disclosed that reduces the mechanical stress on the SLM and may also reduce the mirror position errors associated with previous biasing sequences. One embodiment of the disclosed invention is a method of resetting DMD mirrors which reduces the stress on the DMD hinges by lowering the bias voltage applied to the mirrors after the mirrors have been set. Another embodiment prevents premature mirror position changes, by reducing the voltage used to address the mirror after the mirror is deflected to the desired position. To ensure that the mirror returns to the neutral position during reset, another embodiment of the invention raises the mirror bias voltage during the reset period from ground potential to a voltage level between the two addressing voltages. To decrease the effects of hinge memory and increase the probability of the mirror deflecting the correct direction, another embodiment gradually increases the mirror bias voltage before collapsing the mirror towards an address electrode.

DETAILED DESCRIPTION OF THE PREFERRED EMBODIMENTS

Figure 1A:
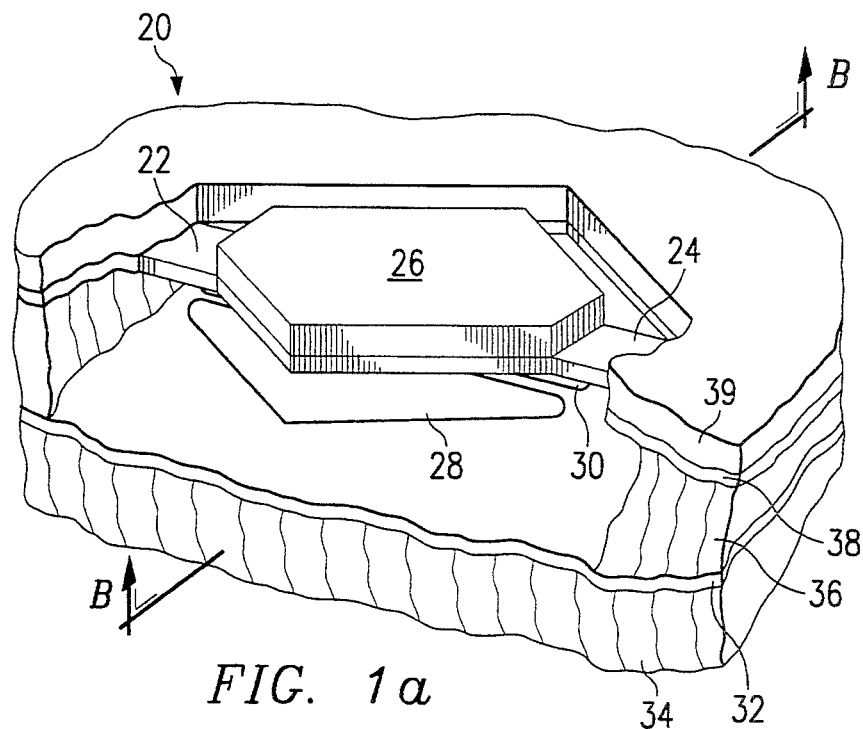
FIG. 1a is a perspective view of a DMD having only address electrodes.
Figure 1B:
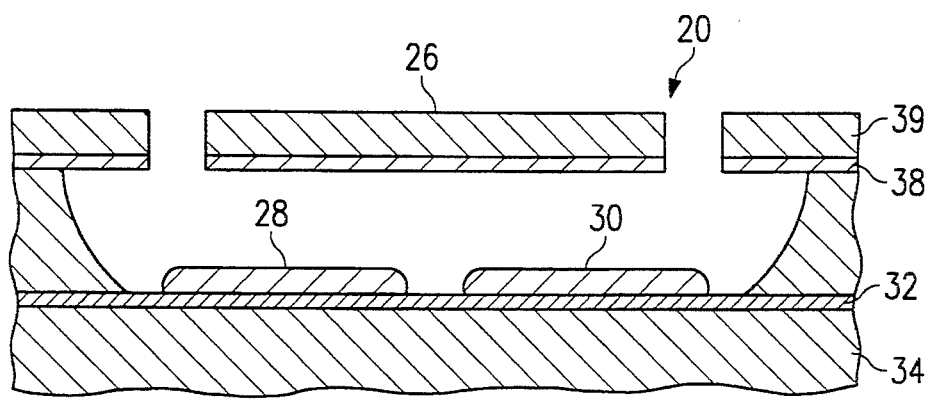
FIG. 1b is a sectional view of the DMD of FIG. 1, taken along B—B of FIG. 1, showing the mirror in a neutral position.

As described in U.S. Pat. No. 5,061,049, "Spatial Light Modulator and Method," assigned to Texas Instruments Incorporated, Digital Micromirror devices (DMDs) are comprised of a very small mirror suspended over an air gap. There are several forms of DMDs, including cantilever beam, cloverleaf, and torsion beam. Although the methods taught are applicable to other forms of DMDs, for the purposes of this discussion, only the torsion beam DMD will be discussed. A simplified torsion beam DMD element 20 is depicted in FIG. 1a. Each torsion beam DMD element 20 consists of a mirror 26, which is supported by two torsion hinges 22 and 24 attached to opposing corners of the mirror 26. The DMD is typically fabricated on a silicon substrate 34 with an insulative layer 32, typically of silicon dioxide, on top of the substrate. Two address electrodes 28 and 30 are fabricated on the insulative layer 32, one on each side of the hinge axis. A planarizing spacer layer 36 is typically spun-on over the insulative layer 32 and layers of hinge metal 38 and mirror metal 39 are deposited over the spacer 36. After etching the mirror metal layer 39 and the hinge metal layer 38 to the proper shape, the spacer 36 is then removed from below the mirror 26 and hinges 22 and 24. FIG. 1b is a sectional view of FIG. 1a taken along line B—B.

Figure 1C:
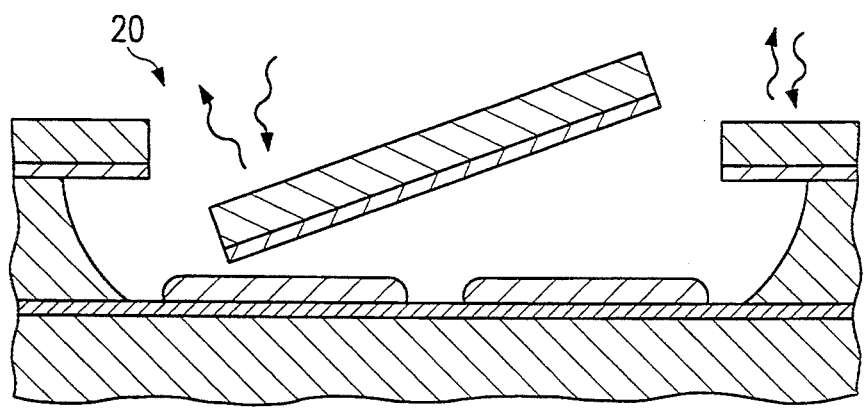
FIG. 1c is a sectional view of the DMD of FIG. 1, taken along B—B of FIG. 1, showing the mirror in a deflected position.

Element 20 is operated by applying a voltage potential to either the mirror 26 or the address electrodes 28 and 30, or typically, both the mirror and the address electrodes. The mirror and address electrode form the two plates of an air gap capacitor and the opposite charges induced on the two plates by the applied voltage exert an electrostatic force which deflects the mirror relative to the address electrode. FIG. 1c shows the DMD of FIG. 1b in a deflected position. The voltages required to deflect a mirror depend on the architecture of the device and the materials used in its construction. The hinge physical parameters such as length, width, and thickness, as well as the hinge material, control the hinge compliance which determines how much force is required to deflect the mirror.

Figure 2:
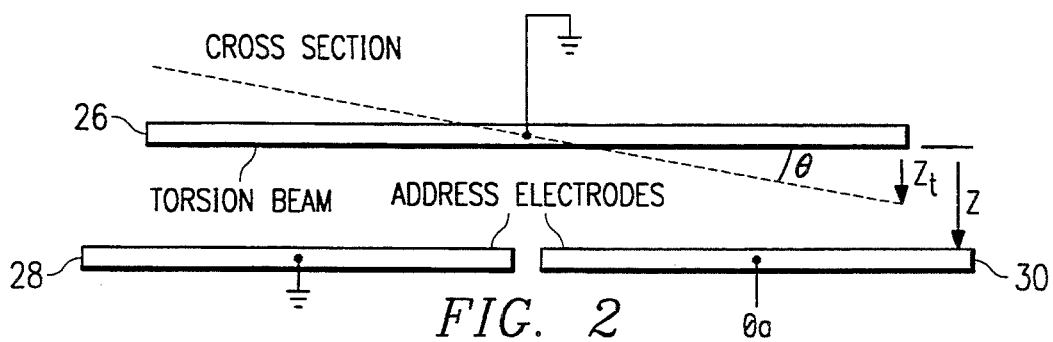
FIG. 2 is a schematic view of the DMD of FIG. 1.
Figure 3:
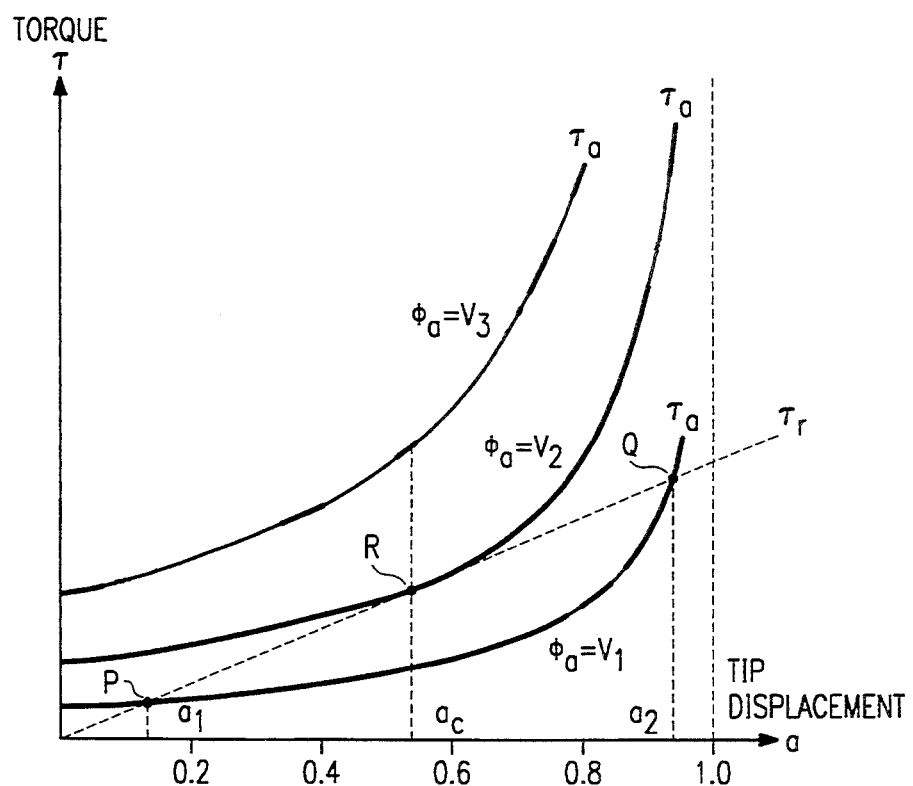
FIG. 3 is a graph of the mirror displacement versus torque for three address voltages applied to the DMD of FIG. 1.

FIG. 2 shows a schematic view of the DMD element 20 of FIG. 1a. FIG. 3 is an approximation of the torque produced by applying a voltage of $\phi_a$ to address electrode 30 of FIG. 2. In FIG. 3, $\tau_a$ represents the torque generated by the electrostatic attractive force between address electrode 30 and the mirror 26, $\tau_r$ represents the restoring torque of the torsion hinges, and $\alpha$ represents the normalized displacement of the mirror tip. The normalized displacement, $\alpha$, is found by dividing the tip displacement, $Z_t$ in FIG. 2 by the air gap Z. Note that while the restoring torque is approximately linear for values of $\alpha$ between 0 and 1, the attractive force increases as a function of displacement. As shown in FIG. 3, a small address voltage, $\phi_a=V_1$, will cause a neutral, $\alpha=0$, mirror to rotate to point P. At point P the restoring torque of the torsion hinges equals the displacing torque of the address electrode and equilibrium is reached. If the mirror is displaced between P and Q, the restoring torque will return the mirror to point P. If the mirror is displaced beyond Q, the attractive torque is greater than the restoring torque and the mirror will rotate until $\alpha=1$ where the mirror is stopped by the address electrode.

For $\phi_a=V_2$ the points P and Q coalesce to a single point R at the tangency of the $\tau_a$ and $\tau_r$ curves. Point R, $\alpha=\alpha_c$, represents a quasi-stable equilibrium: for excursions of $\alpha$ below $\alpha_c$ the net torque restores $\alpha$ towards $\alpha_c$, but for excursions of $\alpha$ above $\alpha_c$ the net torque leads to collapse of the mirror tip to the landing electrode. Thus $V_2$ is the collapse voltage and is denoted $V_c$. For address voltages equal to or greater than the collapse voltage, such as $V_3$, there are no points of zero net torque and the mirror is only stable when it is against the address electrode 30. If the address voltage were applied to address electrode 28 instead of address electrode 30, the mirror would rotate the opposite direction. Thus, for address voltages below $V_c$, the device has an analog deflection that is dependent on the address voltage. At voltages above $V_c$, the device is digital with full deflection in either direction depending on which address electrode is biased by the address voltage. Because this results in only two stable states, the device is called bistable.

Figure 4:
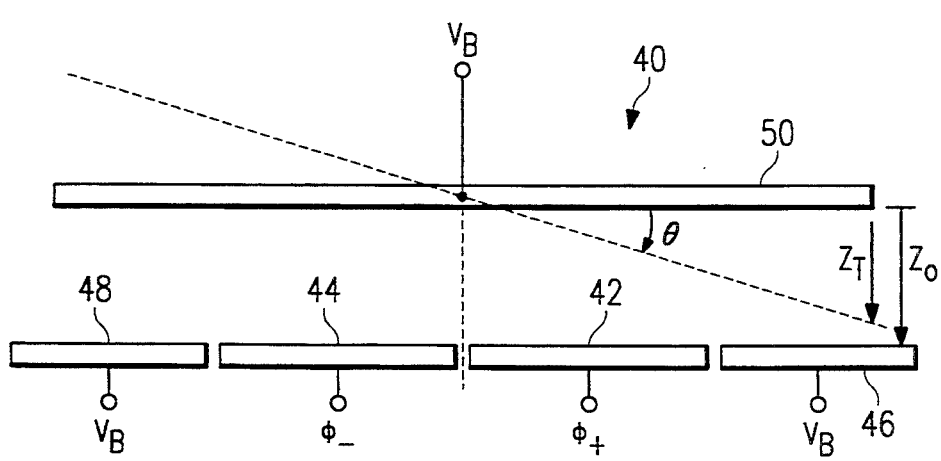
FIG. 4 is a schematic view of a DMD having landing electrodes in addition to address electrodes.

When the mirror touches an address electrode, the voltage differential between the mirror and address electrode causes a large current spike. This current spike may weld the mirror to the address electrode and may fuse the mirror hinges, destroying the device. To avoid the current spike, landing electrodes 46 and 48, as shown in FIG. 4, are fabricated to allow nondestructive bistable operation of the device. The landing electrodes 46 and 48 are held at the same potential as the mirror 50.

Figure 5:
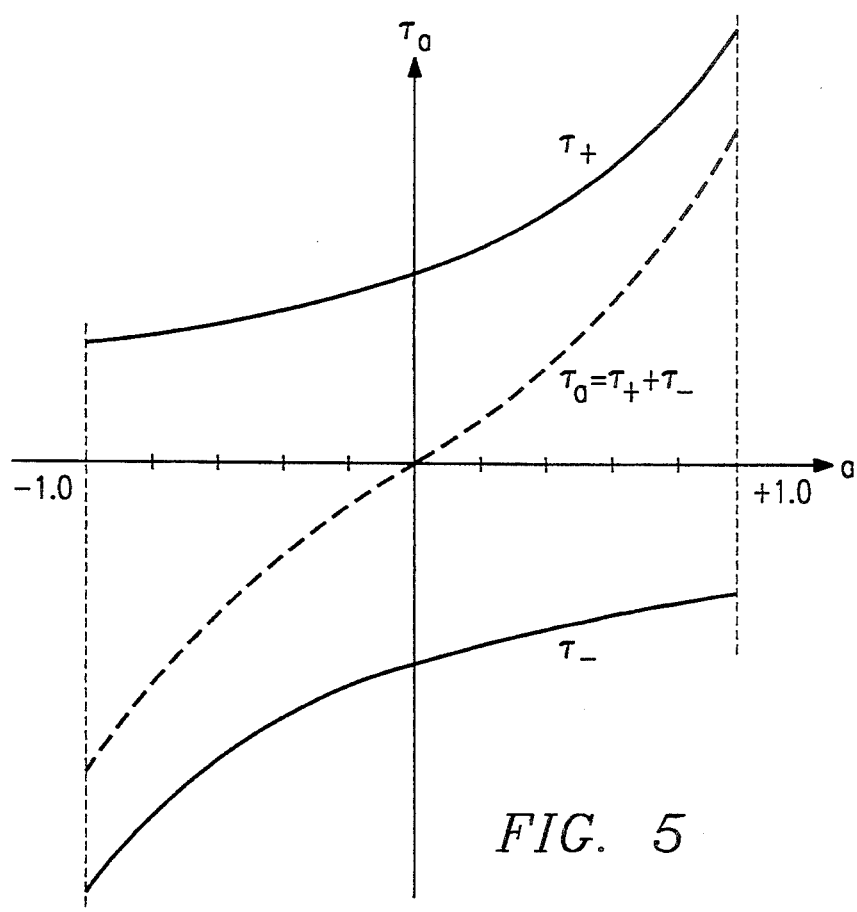
FIG. 5 is a graph of the mirror displacement versus torque for the DMD of FIG. 4 having both address electrodes equally biased.
Figure 6:
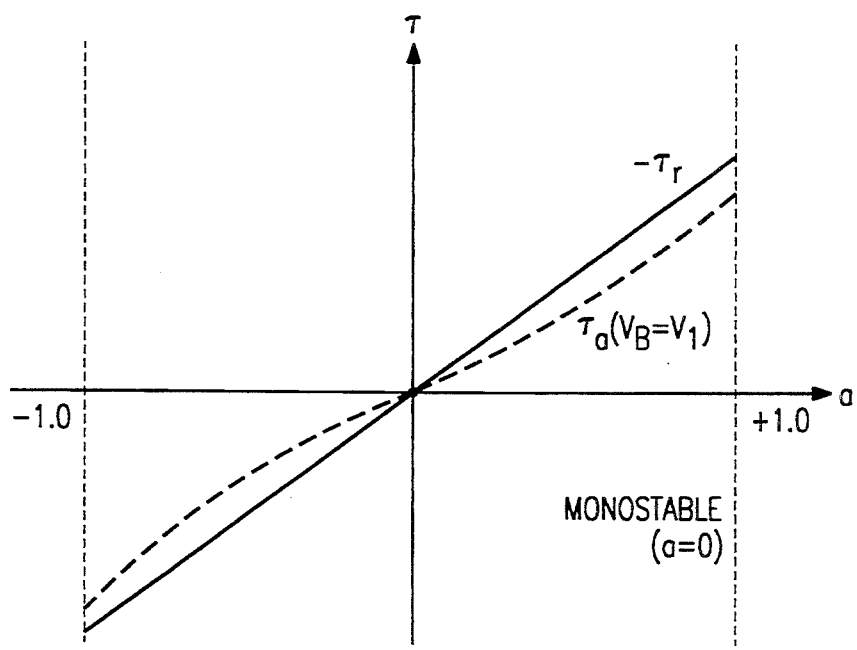
FIG. 6 is a graph of the mirror displacement versus torque for the DMD of FIG. 4 having both address electrodes equally biased at the monostable address voltage.
Figure 7:
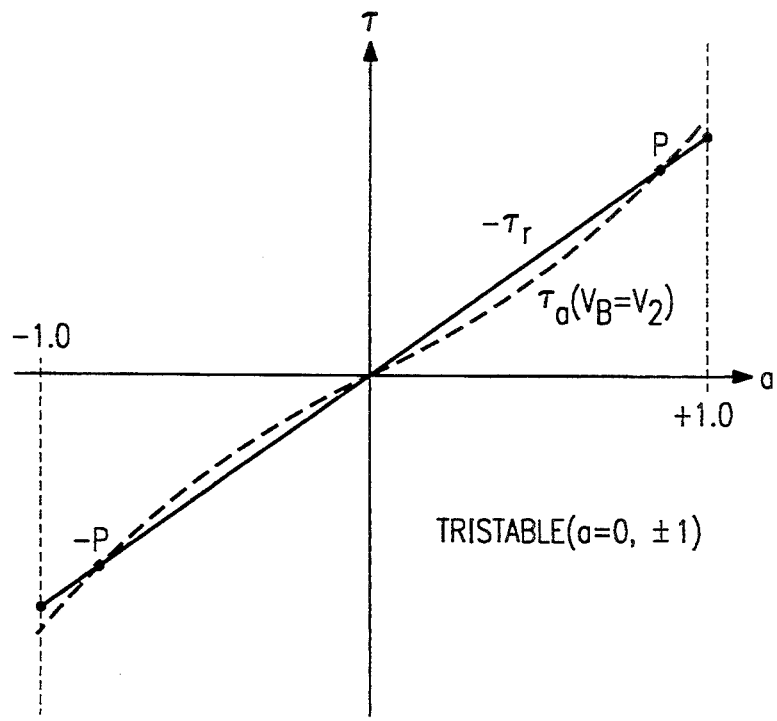
FIG. 7 is a graph of the mirror displacement versus torque for the DMD of FIG. 4 having both address electrodes equally biased at the tristable address voltage.
Figure 8:
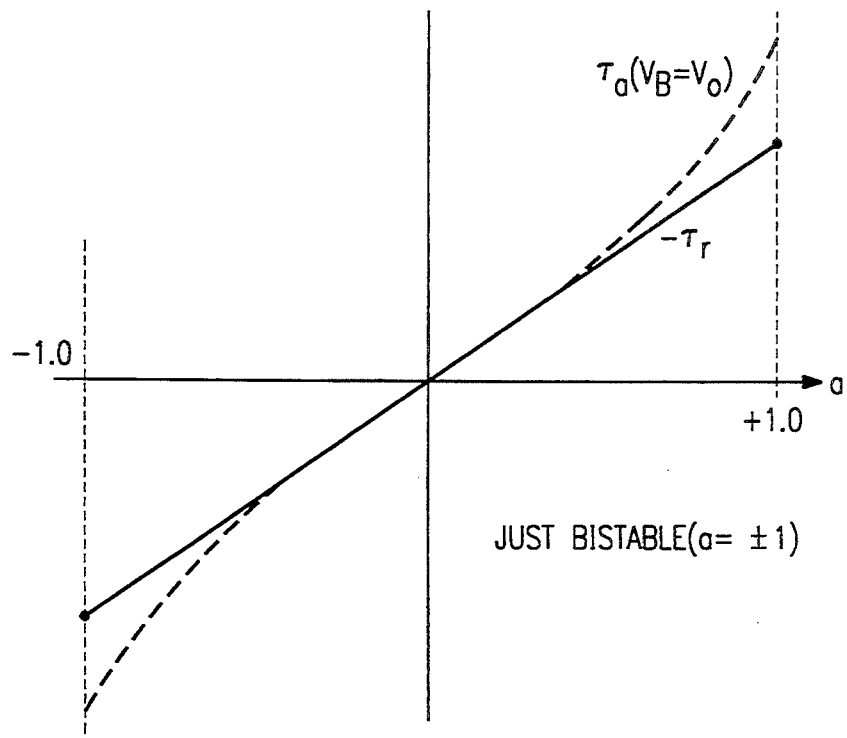
FIG. 8 is a graph of the mirror displacement versus torque for the DMD of FIG. 4 having both address electrodes equally biased at a first bistable address voltage.

FIG. 5 shows the torque produced by element 40 which has both landing electrodes and the mirror grounded, and the same voltage applied to each address electrode. In FIG. 5 the torque from address electrode 42, $\tau_+$, does not increase to infinity as it did in FIG. 3. This is because the landing electrode 46 stops the rotation of the mirror 50 limiting its approach to address electrode 42. The torque from address electrode 44, $\tau_-$, is symmetric to the torque from address electrode 42. The net torque on the mirror 50 from address electrodes 42 and 44 is shown by $\tau_a$. FIGS. 6 through 9 show the net torque, $\tau_a$, and restoring torque, $\tau_r$, on mirror 50 for increasing values of address voltage.

Figure 10:
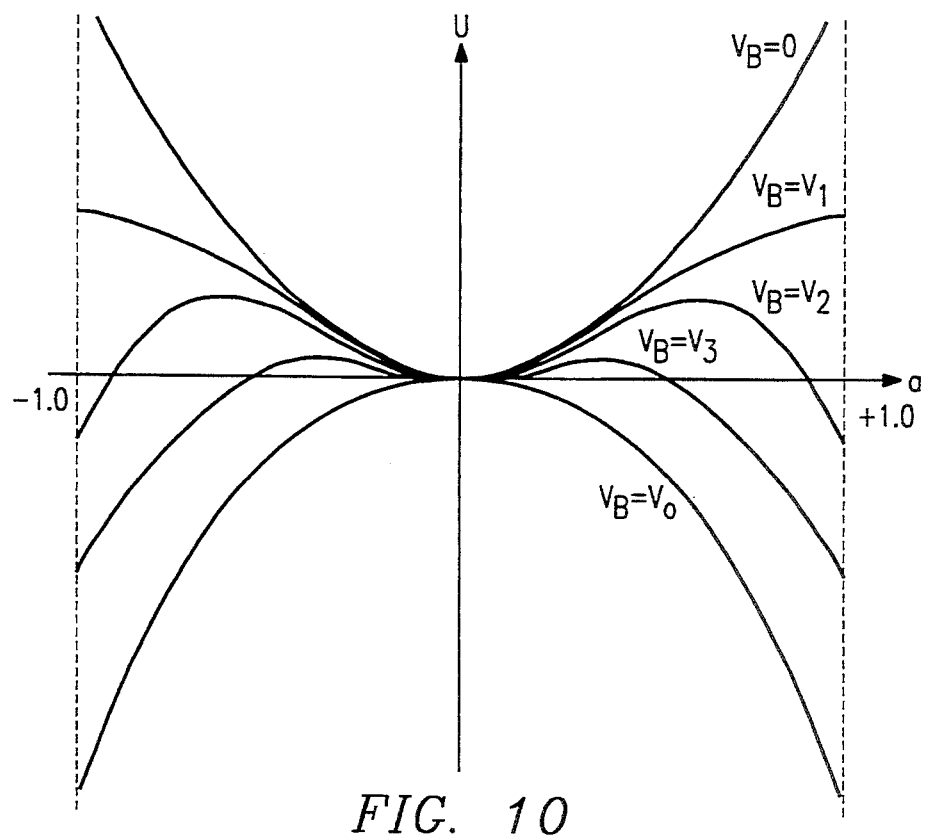
FIG. 10 is a graph of the net potential energy of a mirror for various address voltages.

FIG. 10 shows the net potential energy of the mirror for various bias voltages. For $V_B=0$, the restoring torque is greater than the address torque for any mirror position. This results in one stable mirror position at zero mirror deflection. If $V_B=V_2$, there are three stable mirror positions, $\alpha=-1, 0, +1$. At bias voltages equal to or greater than $V_0$, the device is stable only at $\alpha=\pm1$. Although there is no deflection force on the mirror at $\alpha=0$, the undeflected mirror is not considered a stable point because any small deflection of the mirror will cause the mirror to fully deflect. Thus, for bias voltages equal to or greater than $V_o$, the mirror will be driven to one of the landing electrodes, depending only on the displacement at the time the bias is applied, even though there is not a differential voltage applied to the address electrodes.

Because the electrostatic force that deflects the mirror is caused by the relative difference in potential between the mirror and the address electrodes, grounding the address electrodes and biasing the mirror would have the same effect as the above case where both address electrodes were biased with the same potential and the mirror was grounded. Also, the voltage differential, and not the voltage polarity, determines the electrostatic force that is generated. For example, a mirror bias voltage of $-20$ volts and an address electrode bias of $+6$ volts, would generate the same electrostatic force as a mirror bias of $+26$ volts and an address electrode bias of 0 volts. For the purposes of this disclosure, increasing the bias voltage will refer to increasing the voltage difference between the address electrodes and the mirror. For example, if the address electrodes have a potential of $+6.5$ volts, the mirror bias is increased if the voltage is changed from $-12$ volts to $-20$ volts.

The ability to deflect the mirror by biasing either the mirror or the address electrodes allows the mirror to be deflected a small amount by a low voltage signal applied to the address electrodes, and then driven to the landing electrode by a higher voltage applied to the mirror. Typically, a logic level signal from 0 to $+7$ volts is applied to the address electrodes and a negative voltage, from 0 to $-25$ volts, is applied to the mirror. Once the mirror is biased and driven to the landing electrode, the addressing voltage differential may be removed, or in some cases reversed, without effecting the position of the mirror. This phenomenon is referred to as the electromechanical latching of the mirror.

Figure 11:
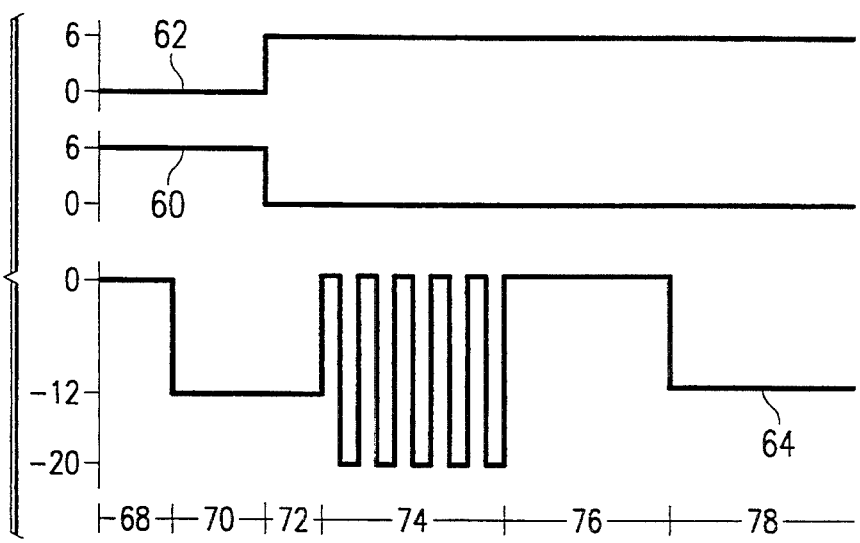
FIG. 11 is a typical DMD mirror bias/reset waveform from the prior art.

FIG. 11 summarizes the typical mirror bias and reset voltages applied to a torsion beam DMD from the prior art. In FIG. 11, the addressing voltages 60 and 62 will be assumed to be differential outputs of a memory cell and will vary between 0 and +6 volts. The mirror bias voltage 64 varies between 0 and −20 volts. Although the mirror bias voltage may go as low as −25 V, most devices will operate with a mirror bias voltage between −5 V and −12 V. The polarities and magnitudes of the voltages chosen may be changed. As mentioned above, the magnitudes of the voltages required to deflect the mirror are dependent on the physical properties of the DMD elements. The polarity of the addressing voltages may be reversed causing an opposite deflection of the mirror. The polarity of the mirror bias voltage may also be reversed. The magnitude of the mirror bias voltage is chosen to ensure that the mirror is always driven to the landing electrode.

During period 68 of FIG. 11, a logic "1" is held in the memory cell, causing +6 V to be applied to one address electrode. The +6 volt bias causes the mirror to rotate a small amount towards the electrode. At the beginning of period 70, a −12 V bias signal is then applied to the mirror causing the mirror to deflect to the landing electrode, thus latching the deflection polarity of period 68. After the mirror is biased, new data may be written to the memory cell causing the polarity of the address signals to change, as shown for period 72. Because of the latching effects of the DMD, the new data does not effect the bistable position of the mirror. When the mirror bias voltage is removed, the mirror may move to represent the present polarity of the address electrode bias.

Often, the mirror tip is stuck to the landing electrode and will not reset on its own. When this occurs, a reset sequence is required to break the mirror free from the landing electrode. The reset sequence is typically a series of reset pulses. Five (5) reset pulses are shown in period 74 of FIG. 11. The purpose of the reset pulses is to store mechanical energy in the mirror in order to spring the mirror away from the landing electrodes, thereby freeing any mirrors that may have been stuck on the landing electrodes. The reset pulses increase the electrostatic attraction between the mirror and both of the address electrodes and are typically chosen to be equal to a plate mode resonant frequency of the mirror, approximately 5 MHz, which is faster than the response time of the mirrors. Because the resonant frequency of the hinges is a much lower frequency, the hinges are not damaged by the resonance.

Each negative voltage reset pulse causes the mirror itself to bend concave upward. When each pulse is turned off, the mirror oscillates to a concave down position imparting a tip reaction force that tends to break the tip free from landing electrode. Before the mirror tip can leave the landing electrode, another reset pulse is applied and the mirror is once again attracted to the address electrode. Each additional pulse increases the amplitude of the oscillation and tip reaction force. After two to five pulses, the mirror oscillations have reached a maximum and further reset pulses are not beneficial. When the pulse train is ended, the mechanical energy stored in the mirror helps the hinge torque to spring the mirror away from the landing electrodes.

After the reset pulse train, the mirror is not biased, allowing it to rotate according to the data written to the memory cell at the beginning of period 72. When the bias is reapplied, as in period 78, the mirror driven to the landing electrode and the polarity of the mirror deflection from period 76 will be latched.

The continuous application of the bias voltage stresses the device structure which can result in permanent bending of the hinge and, in the worst case, breakage of the hinge. One embodiment of the present invention reduces the mirror bias voltage once the mirrors have been driven to the landing electrodes. Referring again to FIG. 10, it can be seen that once the mirror has been fully deflected, a reduced bias voltage, for example $V_2$, will hold the mirror against the landing electrode.

Figure 12:
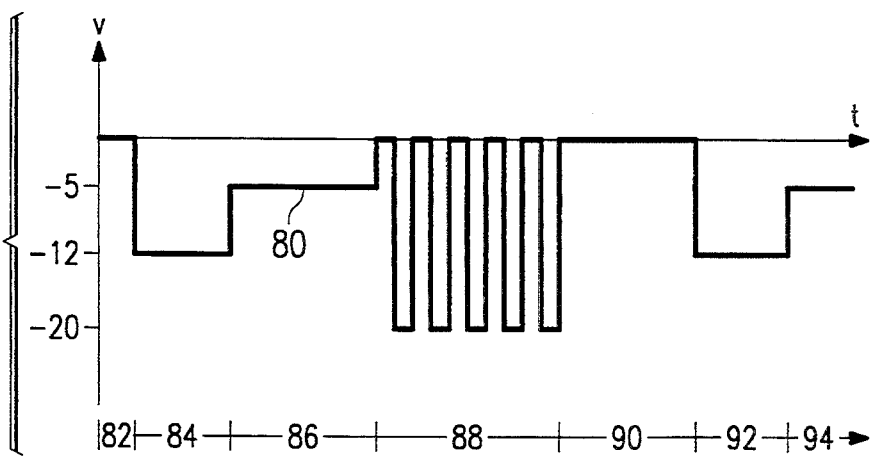
FIG. 12 is a typical DMD mirror bias/reset waveform having a reduced mirror hold voltage according to a first embodiment of the present invention.

FIG. 12 shows one embodiment of a mirror bias and reset waveform according to the present invention. Data is written to the memory cell during period 82 causing the mirror to deflect a small amount. A mirror bias signal greater than the collapse voltage is applied during period 84 to drive the mirror to the landing electrode. After period 84, the mirror has settled against the landing electrode and the mirror bias voltage may be reduced. FIG. 12 shows the mirror bias 80 reduced to −5 V during the mirror hold period 86. The −5 V mirror hold voltage is merely a typical voltage level, other voltage levels could be used with the same effect. The range of voltages that will hold the mirror against the landing electrode is determined by the design of the mirror element. Once the mirror has been driven to the landing electrode, new data may be written to the memory cell without effecting the mirror position. After writing the new data, the mirror may be reset and driven to the landing electrode determined by the new data in the memory cell as shown by periods 88, 90, 92 and 94.

Although reducing the mirror bias voltage during mirror hold periods will reduce the mechanical stress on the device, it will also lower the energy threshold needed to return a latched mirror to the neutral position. Because the address voltage is a larger proportion of the total voltage differential used to hold down the mirror, the tendency for some mirrors to flip from one landing electrode to the other during the hold period in response to new data being written to the memory cell is exacerbated.

Figure 13:
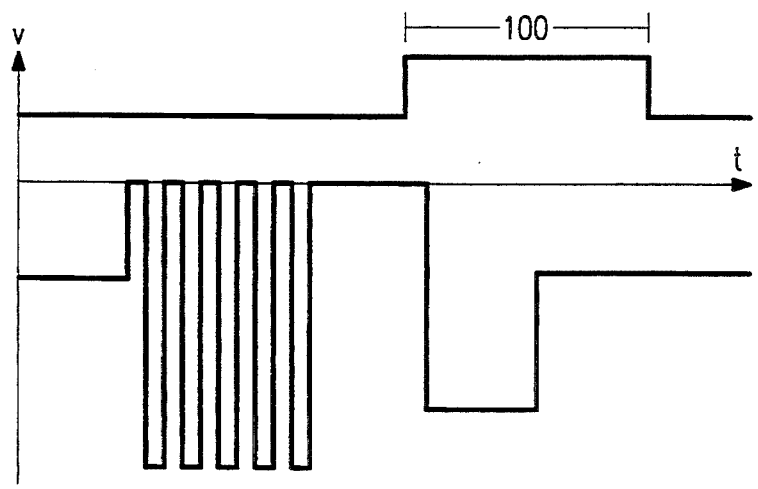
FIG. 13 is a typical DMD mirror bias/reset and memory bias waveform having a reduced memory bias voltage during mirror hold and reset periods according to a second embodiment of the present invention.

According to a second embodiment of this invention, the voltage applied to the addressing electrodes is reduced, except for the period when the mirror is driven to a new position. Reducing the address voltage reduces the contribution of the address voltage to the total voltage differential and therefore reduces the tendency of the mirrors to change state during the mirror hold period. The waveform shown in FIG. 13 is one example of reduced addressing voltages. As shown in FIG. 13, the addressing voltage is reduced from a high value, typically 6 to 7 volts, when the mirror is being driven to a landing electrode, to a lower value, typically 3 to 4 volts when the mirror is being held against a landing electrode. One way to reduce the address voltages is to change the bias voltage of the memory cell holding the data. U.S. Pat. No. 5,285,407, issued Feb. 8, 1994 and entitled "Memory Circuit for Spatial Light Modulator", discloses a memory circuit that allows this embodiment of the present invention to be implemented. In U.S. Pat. No. 5,285,407, a multiplexer selects one of two or more voltages with which to bias the memory cell. According to the present invention, the memory bias multiplexer may be used to select a higher memory cell bias voltage only when necessary to deflect the mirror.

The memory cell bias voltage may be raised simultaneously with, or more preferentially, prior to, the application of the mirror drive bias signal. Although FIG. 13 shows holding the memory cell bias voltage high until after the mirror bias signal is reduced, the memory cell bias voltage may be reduced as soon as the mirror has been latched. To achieve the maximum benefit from the reduced addressing voltage, the memory cell bias voltage should be reduced before new data is written into the memory cell.

Another error occurs when a mirror having a high compliance hinge is biased in such a way that the address voltage is a significant fraction of the differential voltage required to take the mirror from quasi-neutral to bistable. The address voltage may well be strong enough when the mirror is deflected and the separation distance is small, to hold the mirror in place against the reset sequence even in the absence of bias. If this occurs, the mirror will not return to neutral during the period between sequential deflections of the same polarity and the amount of light reflected by the deflected mirror will be slightly greater than intended. This results in differential nonlinearities in pulse-width-modulated gray scales.

Figure 14:
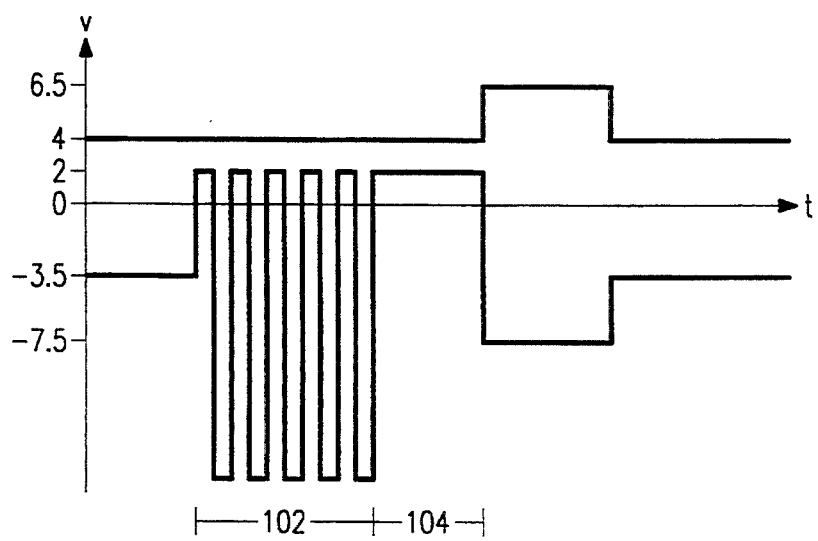
FIG. 14 is a typical DMD mirror bias/reset and memory bias waveform having an offset mirror bias voltage during the mirror reset period according to a third embodiment of the present invention.

One way to fix the differential nonlinearity problem is to reduce the address voltage during the reset and mirror drive periods. While this reduces the nonlinearity problem, it also reduces the address margin and may result in incorrect mirror positioning. A better solution is to bias the mirror approximately halfway between the two address electrode voltages during the reset and mirror settling periods. FIG. 14 depicts a waveform of a third embodiment of the present invention showing the mirror bias voltage raised to approximately 2 volts during reset period 102 and subsequent mirror settling period 104.

Figure 15:
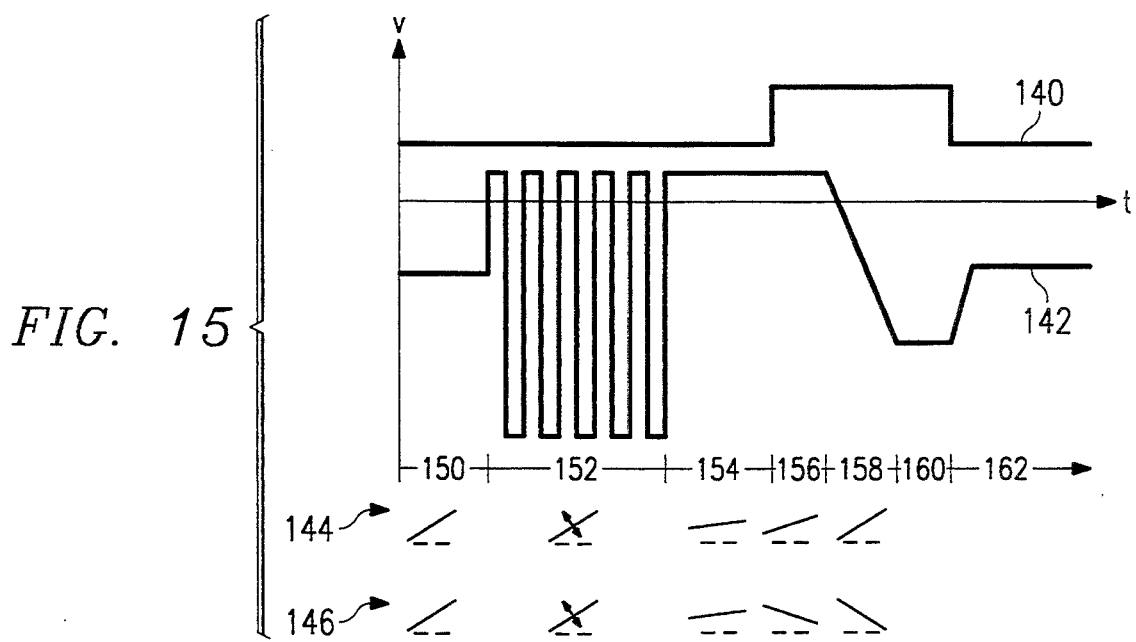
FIG. 15 is a typical DMD mirror bias/reset and memory bias waveform according to a fourth embodiment of the present invention showing the mirror position during each period.

FIG. 15 shows one example of a mirror bias/reset voltage 142 and address electrode bias voltage 140 waveforms that incorporate all three embodiments of the present invention discussed thus far, as well as a fourth embodiment yet to be discussed. Below the waveforms shown in FIG. 15 are two rows of simplified drawings showing the position of the mirror relative to the address electrodes during each period of the waveforms. In period 150 the mirror is held against a landing electrode by a reduced mirror hold voltage. In period 152 the mirror is being reset and is eventually sprung up from the landing electrode. During period 154 the mirror settles to a near neutral state. During period 156 the addressing voltage is raised causing the mirror to deflect depending on the address data. The top row of mirror position drawings 144 shows a mirror where the address data does not change. In the bottom row 146 the address data changes causing the mirror to rotate clockwise.

During period 158 the mirror bias is gradually increased past the collapse voltage causing the mirror to become bistable and be driven against one of the landing electrodes. Although FIG. 15 shows the mirror bias voltage being ramped during period 158, it should be appreciated that alternatives to the ramp exist. For example, in lieu of a ramp, a series of step increases or an exponential waveform could be implemented, or a combination of the three could be used.

Figure 9:
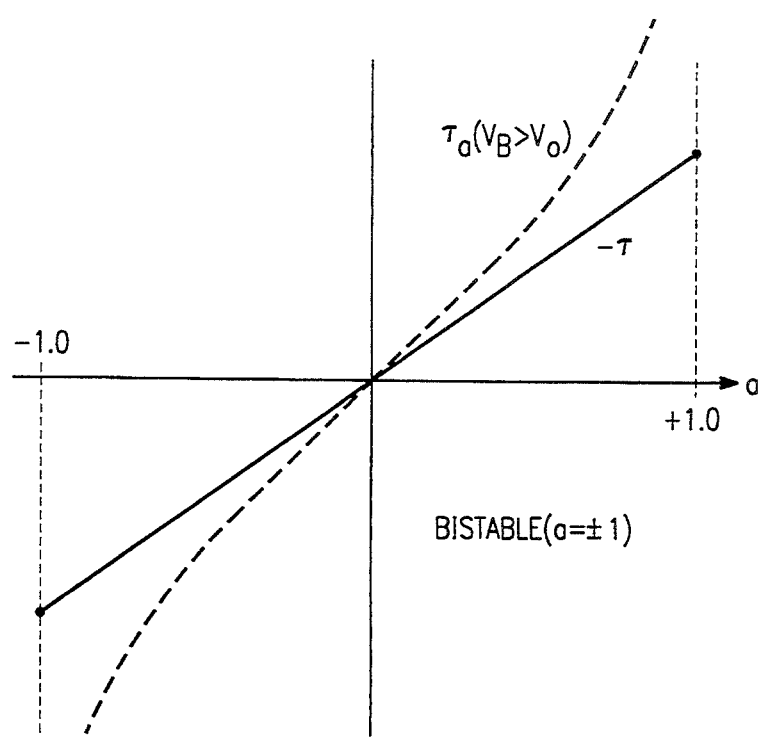
FIG. 9 is a graph of the mirror displacement versus torque for the DMD of FIG. 4 having both address electrodes equally biased at a second bistable address voltage.

Recall from FIG. 9 that at a sufficient mirror bias voltage, the mirror may collapse to an address electrode dependent on the mirror position and independent of the address electrode bias voltages. By using a waveform other than a single step change in mirror bias, the mirror is allowed to rotate towards the desired address electrode before the mirror bias exceeds the collapse voltage and the mirror is forced to the closest electrode. Ideally, the mirror will have already rotated towards the desired address electrode during periods 154 and 156. However, if the mirror has been rotated towards one electrode more than the other electrode, the hinges may have developed hysteresis or memory and the mirror will have a permanent offset towards one electrode even in the absence of any bias signals. When hinge memory occurs, the small electrostatic force generated during periods 154 and 156 may not be sufficient to rotate the mirror past the neutral position. If the mirror bias is stepped past the mirror collapse voltage before the mirror rotates past the neutral position, the mirror may collapse toward the wrong electrode and the display will be incorrect.

A gradual increase in the mirror bias will ensure that the mirror is rotated towards the correct address electrode before collapsing. During period 160 the mirror bias is held above the collapse voltage before being lowered, during period 162, to the reduced mirror hold voltage.

Figure 16:
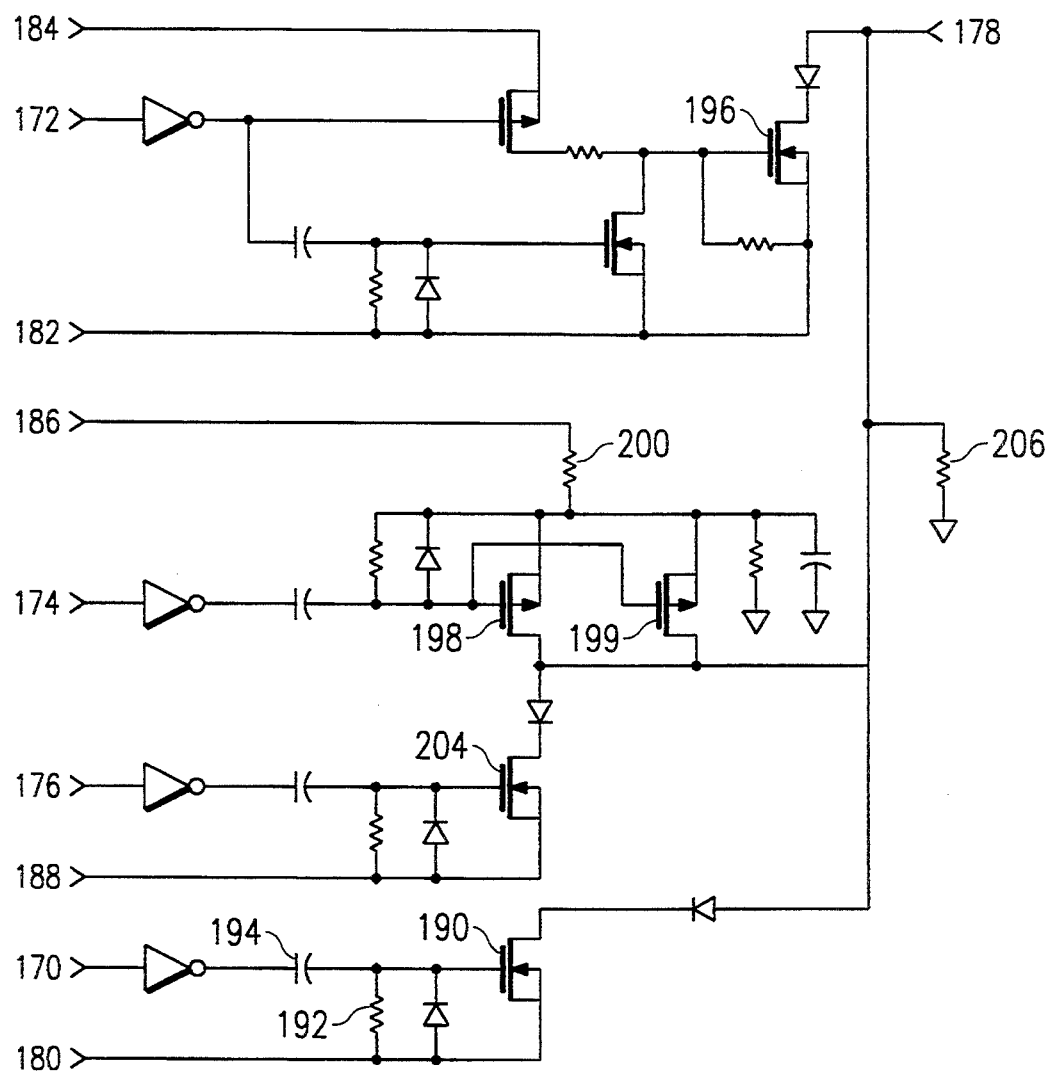
FIG. 16 is a typical schematic for generating a DMD mirror bias/reset voltage waveform.

FIG. 16 shows one possible embodiment of a mirror bias circuit for providing the mirror drive, hold, and reset voltages according to the present invention. In FIG. 16, the mirror bias circuit has four logic level inputs 170, 172, 174, 176 and one output 178. Five individual voltage signals may supplied to the circuit, a mirror drive voltage 180, typically between −8 and −12 volts, for driving the mirrors from neutral to the landing electrodes, a mirror hold voltage 182, typically −3 to −4 volts, for holding the mirrors against the landing electrodes, $V_{cc}$ 184, typically 5 volts, the memory address voltage 186, typically +6.5 volts, and the reset voltage 188, typically −25 volts.

When input 170 is low, transistor 190 will drive the output 178 with the mirror drive voltage 180. The RC time constant of the resistor 192 and capacitor 194, as well as all other RC time constants in the circuit, is chosen to be longer than the switching speeds of the control signals 170, 172, 174, and 176, which are typically 5 MHz. This is to prevent any of the FETs from turning itself on or off spontaneously. All FETs are turned on and off only on corresponding low or high pulses at inputs 170, 172, 174, and 176.

Transistor 196 drives output 178 with the mirror hold voltage 182, when input 172 is high. When input 174 is high, transistor pair 198 and 199 drives output 174 to one-half the memory address voltage. Two transistors 198 and 199 are used to lower the effective "on" resistance of the transistor switch. The memory address voltage is divided by resistors 200 and 202 which typically have the same resistance. When input 176 is a logic low, transistor 204 is turned on and the reset voltage is driven to output 178. Resistor 206 prevents output 178 from floating when no output voltage is applied.

Thus, although there has been described to this point a particular embodiment for a method of resetting digital micromirror devices which results in decreased mechanical stress, and increased mirror timing accuracy, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of resetting a digital micromirror device comprising:
   biasing a pair of address electrodes of a digital micromirror device element, wherein a first voltage is applied to a first address electrode and a second voltage is applied to a second address electrode; and
   biasing a deflectable structure with a third voltage, wherein said third voltage is less than said first voltage and greater than said second voltage.

2. The method of claim 1 wherein said third voltage is approximately halfway between said first voltage and said second voltage.

3. The method of claim 1 further comprising the step of changing the bias of said deflectable structure from said third voltage to a fourth voltage thereby increasing the deflection of said deflectable structure.

4. The method of claim 3 wherein said fourth voltage causes said deflectable structure to be deflected against a landing electrode.

5. The method of claim 4 further comprising the step of reducing the bias of said deflectable structure from said fourth voltage to a fifth voltage.

6. The method of claim 1 wherein said first voltage is increased thereby increasing the deflection of said deflectable structure.

7. A method of operating a digital micromirror device comprising:
   biasing a pair of address electrodes of a digital micromirror device element, wherein a first voltage is applied to a first address electrode and a second voltage is applied to a second address electrode;
   biasing a deflectable structure with a third voltage; and
   increasing the bias applied to said first address electrode from said first voltage to a fourth voltage thereby increasing the deflection of said deflectable structure.

8. The method of claim 7 wherein said third voltage is less than said first voltage and greater than said second voltage.

9. The method of claim 7 wherein said third voltage is approximately halfway between said first voltage and said second voltage.

10. The method of claim 7 further comprising the step of changing the bias of said deflectable structure from said third voltage to a fifth voltage thereby increasing the deflection of said deflectable structure.

11. The method of claim 10 wherein said fifth voltage causes said deflectable structure to be deflected against a landing electrode.

12. The method of claim 11 further comprising the step of reducing the bias of said deflectable structure from said fifth voltage to a sixth voltage.

13. The method of claim 12 wherein said deflectable structure remains in contact with said landing electrode after said bias is reduced to said sixth voltage.

14. A method of operating a digital micromirror device comprising:
   biasing a pair of address electrodes of a digital micromirror device element, wherein a first voltage is applied to a first address electrode and a second voltage is applied to a second address electrode;
   biasing a deflectable structure with a third voltage; and
   changing the bias applied to said deflectable structure gradually from said third voltage to a fourth voltage thereby increasing the deflection of said deflectable structure.

15. The method of claim 14 wherein said changing step comprises ramping the bias applied to said deflectable structure from said third voltage to said fourth voltage.

16. The method of claim 14 wherein said changing step comprises stepping the bias applied to said deflectable structure from said third voltage to said fourth voltage in at least two discrete steps.

17. A method of biasing a digital micromirror device comprising:
   applying a first bias voltage to a deflectable structure, wherein said first bias voltage is greater than a minimum voltage required to deflect said deflectable structure to a limiting position;
   reducing said first bias voltage to a second bias voltage after said deflectable structure is driven to said limiting position, wherein the magnitude of said second bias voltage is less than the magnitude of said first bias voltage.

18. The method of claim 17 wherein said first bias voltage and said second bias voltage are negative voltages.

19. The method of claim 17 wherein said first bias voltage and said second bias voltage are positive voltage.

* * * * *